(12) United States Patent
Ma et al.

(10) Patent No.: US 12,382,012 B2
(45) Date of Patent: Aug. 5, 2025

(54) PARAMETER DETERMINING METHOD, STORAGE MEDIUM, AND ELECTRONIC DEVICE

(71) Applicant: BOE Technology Group Co., Ltd., Beijing (CN)

(72) Inventors: Sen Ma, Beijing (CN); Tao Hong, Beijing (CN); Jinye Zhu, Beijing (CN); Chunmiao Zhou, Beijing (CN); Jing Yu, Beijing (CN); Tianyang Han, Beijing (CN); Jing Liu, Beijing (CN)

(73) Assignee: BOE Technology Group Co., Ltd., Beijing (CN)

(*) Notice: Subject to any disclaimer, the term of this patent is extended or adjusted under 35 U.S.C. 154(b) by 194 days.

(21) Appl. No.: 18/272,598

(22) PCT Filed: Jan. 18, 2022

(86) PCT No.: PCT/CN2022/072573
§ 371 (c)(1),
(2) Date: Jul. 17, 2023

(87) PCT Pub. No.: WO2022/156682
PCT Pub. Date: Jul. 28, 2022

(65) Prior Publication Data
US 2024/0223747 A1    Jul. 4, 2024

(30) Foreign Application Priority Data
Jan. 21, 2021   (CN) .......................... 202110080010.0

(51) Int. Cl.
*H04N 17/00*    (2006.01)
*H04N 13/00*    (2018.01)
(Continued)

(52) U.S. Cl.
CPC ......... *H04N 17/004* (2013.01); *H04N 13/305* (2018.05); *H04N 13/383* (2018.05); *H04N 13/398* (2018.05)

(58) Field of Classification Search
CPC ......... H04N 17/004; H04N 2013/0074; H04N 13/00; H04N 2013/40
(Continued)

(56) References Cited

U.S. PATENT DOCUMENTS

2007/0285537 A1\* 12/2007 Dwinell .................. G06T 7/001
                                                             348/263
2015/0130914 A1    5/2015  Hyodo et al.

FOREIGN PATENT DOCUMENTS

CN         102724545 A    10/2012
CN         106657981 A    5/2017
(Continued)

OTHER PUBLICATIONS

International Search Report for PCT/CN2022/072573 Mailed Apr. 7, 2022.
(Continued)

*Primary Examiner* — Jeffery A Williams
(74) *Attorney, Agent, or Firm* — Ling Wu; Stephen Yang; Ling and Yang Intellectual Property

(57) ABSTRACT

Disclosed are a parameter determining method, a storage medium, and an electronic device. The method comprising: obtaining a standard test image having a preset spatial frequency and a contrast ratio of the standard test image; obtaining a contrast ratio of a viewing effect image corresponding to the standard test image on the basis of the standard test image, the viewing effect image corresponding to the standard test image being an image viewed by a viewer by means of a three-dimensional (3D) display apparatus at a preset viewing distance when the 3D display (Continued)

apparatus displays the standard test image; calculating a ratio of the contrast ratio of the viewing effect image corresponding to the standard test image to the contrast ratio of the standard test image, and determining a resolution parameter at the preset viewing distance.

20 Claims, 10 Drawing Sheets

(51) Int. Cl.
     *H04N 13/305*      (2018.01)
     *H04N 13/383*      (2018.01)
     *H04N 13/398*      (2018.01)

(58) Field of Classification Search
     USPC .......................................................... 348/51
     See application file for complete search history.

(56) References Cited

FOREIGN PATENT DOCUMENTS

| | | |
|---|---|---|
| CN | 107888906 A | 4/2018 |
| CN | 114827580 A | 7/2022 |

OTHER PUBLICATIONS

Derek Fender et al., Extension of Panum's Fusional Area in Binocularly Stabilized Vision, Journal of The Optical Society of America, Jun. 1967, vol. 57, No. 6, pp. 819-830.

\* cited by examiner

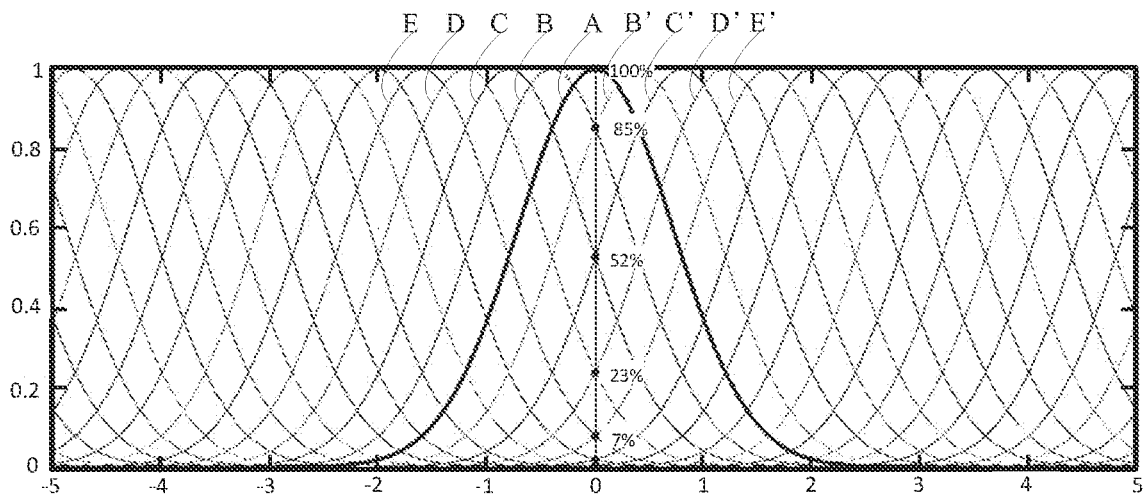

FIG. 1D

```
┌─────────────────────────────────────────────────────────┐
│ Obtain a standard test image with a preset spatial frequency │─── 201
│       and a contrast ratio of the standard test image         │
└─────────────────────────────────────────────────────────┘
                              │
                              ▼
┌─────────────────────────────────────────────────────────┐
│     Obtain a contrast ratio of a viewing effect image         │
│   corresponding to the standard test image based on the       │
│      standard test image, wherein the viewing effect image    │─── 202
│   corresponding to the standard test image is an image that a │
│       viewer is able to view through a three-dimensional (3D) │
│    display apparatus at a preset viewing distance when the 3D │
│        display apparatus displays the standard test image     │
└─────────────────────────────────────────────────────────┘
                              │
                              ▼
┌─────────────────────────────────────────────────────────┐
│  Calculate a ratio of the contrast ratio of the viewing effect │
│     image corresponding to the standard test image to the     │
│      contrast ratio of the standard test image, and determine a │
│   resolution parameter at the preset viewing distance, wherein │─── 203
│      the resolution parameter at the preset viewing distance is │
│   used for representing stereoscopic display quality when the │
│        3D display apparatus displays an image with the preset │
│           spatial frequency at the preset viewing distance    │
└─────────────────────────────────────────────────────────┘
```

FIG. 2

PARAMETER DETERMINING METHOD, STORAGE MEDIUM, AND ELECTRONIC DEVICE

CROSS-REFERENCE TO RELATED APPLICATIONS

The present application is a U.S. National Phase Entry of International Application No. PCT/CN2022/072573 having an international filing date of Jan. 18, 2022, which claims priority to Chinese Patent Application No. 202110080010.0 filed to the CNIPA on Jan. 21, 2021 and entitled "Parameter Determining Method, Storage Medium, and Electronic Device". The entire contents of the above-identified applications are hereby incorporated by reference.

TECHNICAL FIELD

Embodiments of the present disclosure relate to, but are not limited to, the field of display technologies, in particular to a parameter determining method, a storage medium, and an electronic device.

BACKGROUND

With continuous development of display technologies, a three-dimensional (3D) display technology has attracted more and more attention. For a multi-viewpoint 3D display apparatus, during 3D display, it is easy for a viewer to view an image of an adjacent viewpoint at a certain viewpoint. An interference of the image of the adjacent viewpoint (recorded as an adjacent view) to an image of this viewpoint (recorded as a correct view) is called crosstalk, the crosstalk will reduce a stereoscopic display effect, and even cause a brain to fail to accurately fuse 3D scenarios, which seriously affects viewing experience.

At present, a crosstalk energy ratio (that is, a ratio of adjacent view energy to correct view energy) is generally used as a parameter to evaluate display quality of the 3D display apparatus. However, since a parallax between the adjacent view and the correct view is usually small, the crosstalk energy ratio cannot accurately reflect stereoscopic display quality of the 3D display apparatus.

SUMMARY

The following is a summary of subject matters described herein in detail. The summary is not intended to limit the protection scope of claims.

The embodiments of the present disclosure mainly provide following technical solutions.

In a first aspect, an embodiment of the present disclosure provides a parameter determining method, including: obtaining a standard test image with a preset spatial frequency and a contrast ratio of the standard test image; obtaining a contrast ratio of a viewing effect image corresponding to the standard test image based on the standard test image, wherein the viewing effect image corresponding to the standard test image is an image that a viewer is able to view through a three-dimensional (3D) display apparatus at a preset viewing distance when the 3D display apparatus displays the standard test image; calculating a ratio of the contrast ratio of the viewing effect image corresponding to the standard test image to the contrast ratio of the standard test image, and determining a resolution parameter at the preset viewing distance, wherein the resolution parameter at the preset viewing distance is used for representing stereoscopic display quality when the 3D display apparatus displays an image with the preset spatial frequency at the preset viewing distance.

In a second aspect, an embodiment of the present disclosure provides a computer-readable storage medium, which includes a stored program, wherein a device where the storage medium is located is controlled to execute acts of the method described above when the program is run.

In a third aspect, an embodiment of the present disclosure provides an electronic device, including: a processor and a memory storing a computer program that is runnable on the processor, wherein acts of the method described above are implemented when the processor executes the program.

Other characteristics and advantages of the present disclosure will be set forth in the following specification, and moreover, partially become apparent from the specification or are understood by implementing the present disclosure. Other advantages of the present disclosure may be achieved and obtained through solutions described in the specification and drawings.

Other aspects may be understood upon reading and understanding the drawings and detailed description.

BRIEF DESCRIPTION OF DRAWINGS

The drawings are used for providing a further understanding of the technical solutions of the present disclosure and constitute a portion of the specification, are used for explaining the technical solutions of the present disclosure together with the embodiments of the present disclosure, and do not constitute a limitation on the technical solutions of the present disclosure. Shapes and sizes of components in the drawings do not reflect actual scales, and are only intended to schematically illustrate contents of the present disclosure.

FIG. 1D is a schematic diagram of white light brightness curves of a plurality of viewpoints of a 3D display apparatus.

FIG. 2 is a schematic diagram of a flow of a parameter determining method in an embodiment of the present disclosure.

DETAILED DESCRIPTION

Figure 1A:
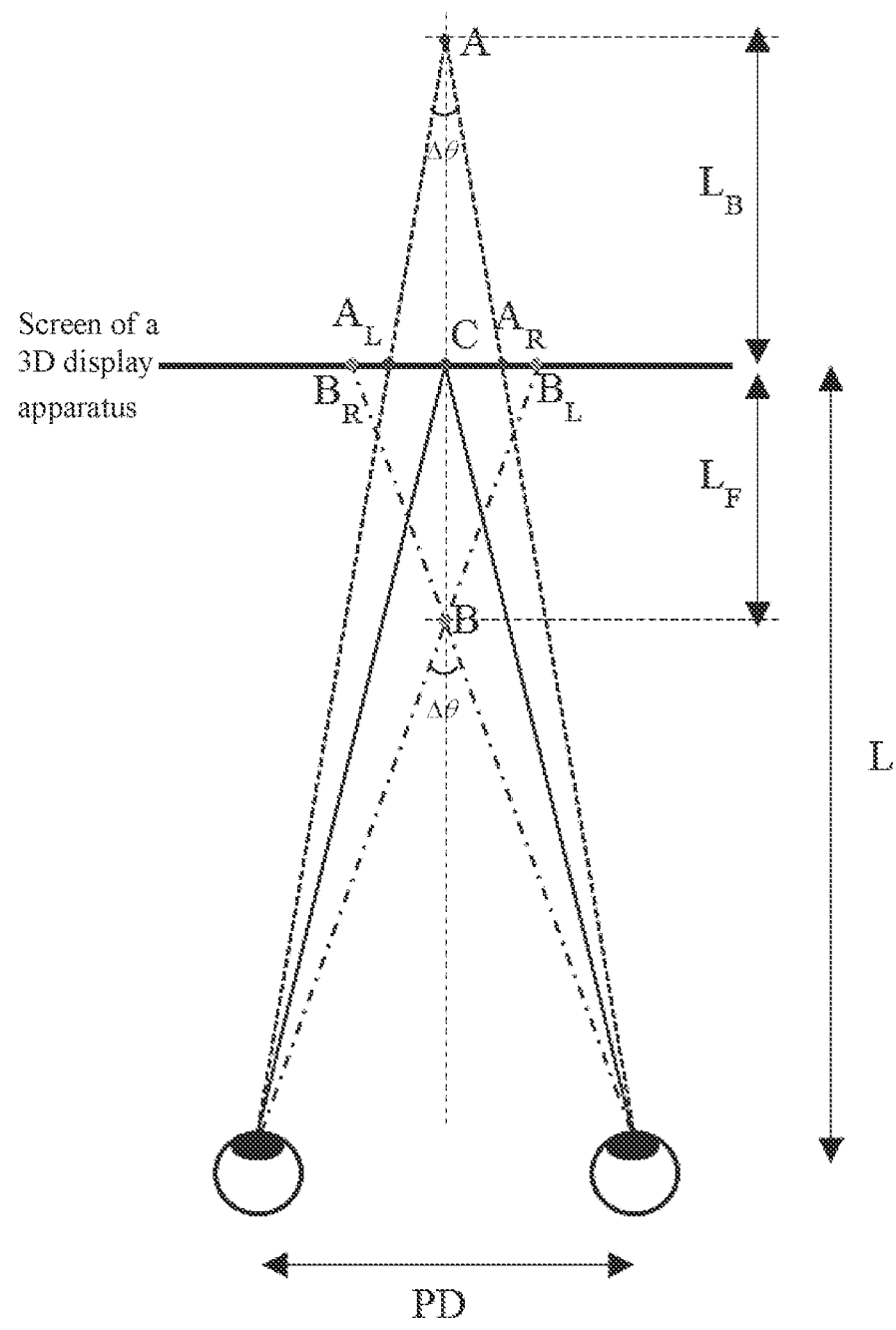
FIG. 1A is a schematic diagram of a principle of 3D display.

Many embodiments are described herein, but the description is exemplary rather than restrictive, and there may be more embodiments and implementation solutions within the scope contained in the embodiments described herein. Although many possible feature combinations are shown in the drawings and discussed in exemplary implementation modes, many other combinations of the disclosed features are possible. Unless expressly limited, any feature or element of any embodiment may be used in combination with, or may replace, any other feature or element in any other embodiment.

When a representative embodiment is described, a method or process may already be presented in a specific order of acts in the specification. However, the method or the process should not be limited to the acts with the specific order on a premise that the method or the process is independent of the specific order of the acts described herein. As will be understood by those of ordinary skill in the art, other act orders are possible. Therefore, the specific order of the acts illustrated in the specification should not be interpreted as a limitation on claims. Moreover, the claims directed to the method and/or process should not be limited to performing their acts in the described order, and those skilled in the art will readily understand that these orders may be varied and still remain within the spirit and scope of the embodiments of the present disclosure.

Unless otherwise defined, technical terms or scientific terms used in the embodiments shall have common meanings understood by people with ordinary skills in the field to which the present disclosure pertains. "First", "second", and similar terms used in the embodiments of the present disclosure do not represent any order, quantity, or importance, but are only used for distinguishing different components. "Include", "contain", or a similar term means that an element or object appearing before the term covers an element or object and equivalent thereof listed after the term and does not exclude another element or object. "Connect", "join", or a similar term is not limited to a physical or mechanical connection, but may include an electrical connection, whether direct or indirect.

A 3D display technology may make a display picture stereoscopic and realistic. Its principle is that a viewer's left and right eyes receive different views respectively, and after a brain superimposes and regenerates image information, an image with a stereoscopic display effect may be constructed. Compared with conventional flat display, 3D display can restore a display scenario more realistically and give people more shocking viewing experience.

In practical applications, depending on different implementation modes of 3D display technologies, a 3D display apparatus may be usually classified into a 3D display apparatus that needs glasses (for example, a 3D display apparatus using shutter glasses or a 3D display apparatus using polarized glasses) and a 3D display apparatus that does not need glasses (for example, a 3D display apparatus using a light-splitting assembly such as a lenticular grating, a slit, polarization light splitting, or a parallax barrier). Among them, the 3D display apparatus that does not need glasses is mainly based on a principle of binocular parallax to achieve 3D display, by using a light-splitting assembly such as a lenticular grating, a slit, polarization light splitting, or a parallax barrier, a parallax image displayed on a screen of 3D display apparatus is partially projected into a left eye and partially into a right eye. In this way, two eyes may see images from different viewpoints of a 3D scenario. When a left-eye image and a right-eye image of a same object point have a certain distance on the screen, a human brain can fuse these two misaligned images, understand them as a same point, and produce feeling that the object point is located in front of the screen (out of the screen) or behind the screen (into the screen), that is, to produce 3D feeling. As shown in FIG. 1A, a distance between two eyes of a viewer is PD, a distance between the viewer and a screen of a 3D display apparatus is L, and a parallax 3D image is displayed on the screen. For example, if a left eye image of a certain object point A is displayed at an $A_L$ position of the screen and a right eye image of the object point A is displayed at an $A_R$ position of the screen, a brain may fuse the misaligned two-point images, and the viewer may feel that the point A is located behind the screen (into the screen). For example, if a left eye image of a certain object point B is displayed at a $B_L$ position of the screen, and a right eye image of the object point B is displayed at a $B_R$ position of the screen, the brain may fuse the misaligned two-point images, and the viewer may feel that the point B is located in front of the screen (out of the screen). For example, if a left eye image and a right eye image of a certain object point C are not misaligned on the screen, the brain feels that the point C is located on the screen. It may be seen that an out-of-screen depth or in-screen depth of an image perceived by a brain is related to misalignment of left and right eye images on a screen. The greater the misalignment of left and right eye images is, the greater the out-of-screen depth or in-screen depth is. Here, an in-screen depth $L_B$ or an out-of-screen depth $L_F$ may be calculated through following formulas (1) and (2).

$$L_B = \frac{PD}{2} \times \tan\left(\arctan\frac{2L}{PD} + \frac{\Delta\theta}{2}\right) - L \quad \text{formula (1)}$$

$$L_F = L - \frac{PD}{2} \times \tan\left(\arctan\frac{2L}{PD} - \frac{\Delta\theta}{2}\right) \quad \text{formula (2)}$$

Among them, $L_B$ represents the in-screen depth, $L_F$ represents the out-of-screen depth, PD represents a distance between two eyes of a viewer, L represents a distance (also known as a viewing distance) between the viewer and a screen of a 3D display apparatus, and $\Delta\theta$ is a flare angle of misalignment of left and right eye images on the screen to human eyes (also known as a parallax angle of the viewer at the viewing distance L).

Figure 1B:
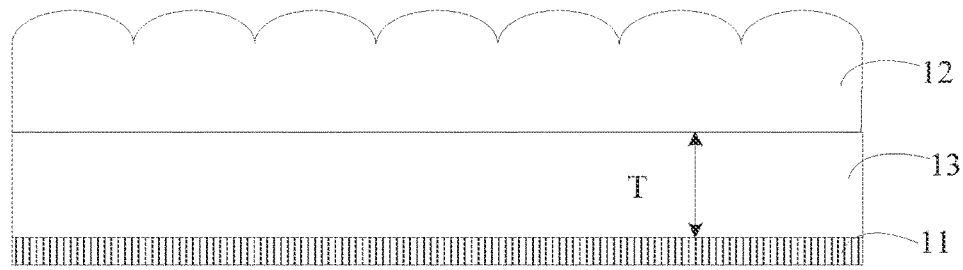
FIG. 1B is a schematic diagram of a structure of a 3D display apparatus.

FIG. 1B is a schematic diagram of a structure of a 3D display apparatus. As shown in FIG. 1B, the 3D display apparatus may include a display panel 11 and a light-splitting assembly (such as a lenticular grating 12) disposed on a light-emitting side of the display panel 11. The display panel 11 is configured to display a three-dimensional image with M viewpoints, and the light-splitting assembly is configured to perform a light splitting processing on light emitted by pixels in the display panel 11 so as to project light emitted by pixels corresponding to different viewpoints to different regions in space, to form M viewpoints in the space, and to achieve three-dimensional display (i.e., multi-viewpoint display), wherein M is a positive integer greater than or equal to 2. Here, FIG. 1B is illustrated by taking a case where the beam-splitting assembly is achieved by the lenticular grating 12 as an example. For example, as shown in FIG. 1B, the 3D display apparatus may further include a spacer dielectric layer 13 disposed on a side of the display panel 11 close to the lenticular grating 12, wherein the spacer dielectric layer 13 has a certain thickness T and is configured to ensure that the display panel 11 is in a focal plane of the lenticular grating 12 to obtain a best collimation effect. For example, a material of the spacer dielectric layer may be a transparent material, such as glass or Polyethylene Terephthalate (PET).

For example, the display panel may include a plurality of pixels arranged along a row direction (i.e., a first direction X) and a column direction (i.e., a second direction Y, which intersects the first direction X). The lenticular grating may include a plurality of cylindrical lenses arranged in parallel with each other and sequentially arranged along the first direction X. All pixels of the display panel covered by at least one cylindrical lens may be divided into at least one 3D pixel, and the at least one 3D pixel may be sequentially arranged along an extension direction Z of the at least one cylindrical lens (e.g., there is an included angle θ between the extension direction Z of the lenticular grating and the second direction Y of the display panel). Here, the pixels covered by the at least one cylindrical lens may refer to pixels for which light is split through the at least one cylindrical lens. Each 3D pixel may be a pixel group including M pixels corresponding to M viewpoints provided by the light-splitting assembly one by one, wherein M is a positive integer greater than or equal to 2. For example, a pixel corresponding to each viewpoint may be a pixel unit including a red sub-pixel (R sub-pixel), a green sub-pixel (G sub-pixel), and a blue sub-pixel (B sub-pixel). For example, the pixel corresponding to each viewpoint may only be one of the three sub-pixels of R, G, and B. For another example, the pixel corresponding to each viewpoint may be a pixel unit including an R sub-pixel, a G sub-pixel, a B sub-pixel, and a white sub-pixel (W sub-pixel). Here, the embodiment of the present disclosure is not limited to this.

Figure 1C:
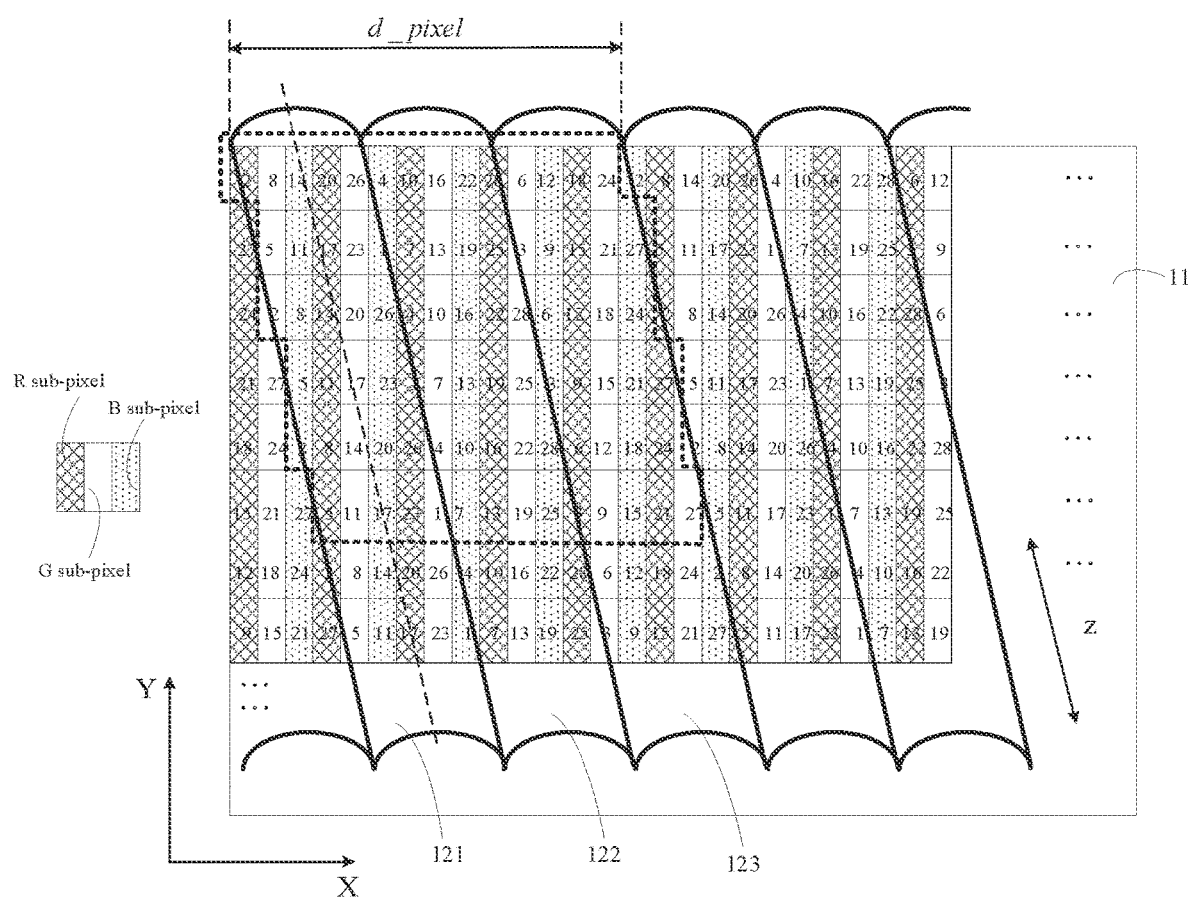
FIG. 1C is an enlarged partial schematic diagram of a display panel and a lenticular grating in a 3D display apparatus.

For example, FIG. 1C shows one 3D pixel among all 3D pixels divided into by all pixels in the display panel 11 covered by three cylindrical lenses of a first cylindrical lens 121, a second cylindrical lens 122, and a third cylindrical lens 123 (i.e., a group of pixels shown in a dashed line box in FIG. 1C, d_pixel representing a width of a 3D pixel). Twenty-eight viewpoints are also shown in FIG. 1C, wherein a number marked on each sub-pixel in FIG. 1C is a serial number of a viewpoint that it is responsible for displaying. For example, a layout is designed so that a relative position of a pixel in the display panel and the lenticular grating changes periodically. 84 sub-pixels in the dashed line box in FIG. 1C are one period (i.e., No. 1 sub-pixel (including No. 1 R sub-pixel, No. 1 G sub-pixel, and No. 1 B sub-pixel) to No. 28 sub-pixel (including No. 28 R sub-pixel, No. 28 G sub-pixel, and No. 28 B sub-pixel) shown in the dashed line box in FIG. 1C may be one 3D pixel, forming one 3D pixel). Here, distances between sub-pixels corresponding to different viewpoints and an axis of the lenticular grating are different (that is, distances between sub-pixels with different viewpoint serial numbers and axes of cylindrical lenses corresponding to the sub-pixels are different). Therefore, angles of light emitted by sub-pixels corresponding to different viewpoint serial numbers in all 3D pixels are different after passing through corresponding cylindrical lenses. Therefore, the light emitted by the sub-pixels corresponding to different viewpoint serial numbers in all 3D pixels achieves separation of different viewpoints in space (that is, light emitted by sub-pixels corresponding to a same viewpoint serial number in all 3D pixels forms one viewpoint after passing through corresponding cylindrical lenses), to spatially separate or isolate a left-eye image portion and a right-eye image portion displayed on the display panel in directions of a left eye and a right eye of a viewer, respectively, and thus 3D display may be achieved.

Taking a 3D display apparatus with multiple viewpoints shown in FIG. 1C as an example, and taking a case where there may be images of six consecutive viewpoints provided between left and right eyes of the viewer as an example, a crosstalk energy ratio between images of adjacent viewpoints is relatively large for the 3D display apparatus with multiple viewpoints shown in FIG. 1C. For example, FIG. 1D is a schematic diagram of white light brightness curves of a plurality of viewpoints of a 3D display apparatus. As shown in FIG. 1D, images (denoted as adjacent views) of left and right four adjacent viewpoints adjacent to a first viewpoint A will bring crosstalk to an image of the first viewpoint A (denoted as correct views), wherein energy of the first viewpoint A to which each of a second viewpoint B and a third viewpoint B' brings crosstalk reaches 85% of energy of the first viewpoint A, energy of the first viewpoint A to which each of a fourth viewpoint C and a fifth viewpoint C' brings crosstalk reaches 52% of the energy of the first viewpoint A, energy of the first viewpoint A to which each of a sixth viewpoint D and a seventh viewpoint D' brings crosstalk reaches 23% of the energy of the first viewpoint A, and energy of the first viewpoint A to which each of an eighth viewpoint E and a ninth viewpoint E' brings crosstalk reaches 7% of the energy of the first viewpoint A, thus a sum of crosstalk energy ratios of the first viewpoint A to which adjacent viewpoints of the first viewpoint A bring crosstalk is as high as 334%. However, since a parallax between an adjacent view and a correct view is relatively small, that is to say, there is a great correlation between the adjacent view and the correct view, which will lead to no definite correspondence between a crosstalk energy ratio and a subjective viewing effect of an image. At this time, although crosstalk will reduce a display effect to show "blur", a viewer's eyes actually can't subjectively feel obvious degradation of display quality of the image. It may be seen that when a crosstalk energy ratio is taken as a display quality parameter, it cannot accurately reflect a viewing effect actually felt by the viewer's eyes. That is, based on a crosstalk energy ratio, display quality of a multi-viewpoint 3D display apparatus cannot be accurately reflected. Therefore, it is of great significance to determine a display quality parameter that can combine crosstalk with subjective feeling of a viewer's eyes to accurately reflect display quality of a 3D display apparatus for improving a display effect of the 3D display apparatus.

An embodiment of the present disclosure provides a parameter determining method. In practical applications, the parameter determining method may be applied to a scenario where display quality of a 3D display apparatus is monitored. For example, a display quality parameter of the 3D display apparatus at each spatial frequency determined by the parameter determining method in a product design stage may be fed back to guide a design process, and a 3D display apparatus with a higher display effect may be designed. For example, in a product testing stage, the display quality parameter of the 3D display apparatus at each spatial frequency determined by the parameter determining method is used for determining whether stereoscopic display quality of the 3D display apparatus is qualified, and a product yield may be monitored.

In an exemplary embodiment, a 3D display apparatus provided by an embodiment of the present disclosure may be a liquid crystal display apparatus or another apparatus with a display function.

In an exemplary embodiment, the 3D display apparatus may be any product or component with a display function such as a mobile phone, a tablet computer, a television, a display, a notebook computer, a digital photo frame, or a navigator. Other essential components of the 3D display apparatus are those that that should be understood by those of ordinary skill in the art to be had, which will not be repeated here, and should not be taken as a limitation to the present disclosure.

FIG. 2 is a schematic diagram of a flow of a parameter determining method in an embodiment of the present disclosure. As shown in FIG. 2, the parameter determining method may include following acts.

Act 201: obtaining a standard test image with a preset spatial frequency and a contrast ratio of the standard test image.

Act 202: obtaining a contrast ratio of a viewing effect image corresponding to the standard test image based on the standard test image, wherein the viewing effect image corresponding to the standard test image is an image that a viewer is able to view through a three-dimensional (3D) display apparatus at a preset viewing distance when the 3D display apparatus displays the standard test image.

Here, a spatial frequency of the viewing effect image corresponding to the standard test image is a preset spatial frequency.

Act 203: calculating a ratio of the contrast ratio of the viewing effect image corresponding to the standard test image to the contrast ratio of the standard test image, and determining a resolution parameter at the preset viewing distance, wherein the resolution parameter at the preset viewing distance is used for representing stereoscopic display quality when the 3D display apparatus displays an image with the preset spatial frequency at the preset viewing distance.

In this way, since the viewing effect image corresponding to the standard test image with the preset spatial frequency is an image that a viewer can actually view through the three-dimensional (3D) display apparatus at the preset viewing distance when the standard test image with the preset spatial frequency is displayed by the 3D display apparatus, the ratio of the contrast ratio of the viewing effect image corresponding to the standard test image to the contrast ratio of the standard test image may relate an influence of crosstalk with quality of the image actually seen by the viewer (that is, the influence of crosstalk may be combined with subjective feeling of the viewer's eyes). In this way, the ratio of the contrast ratio of the viewing effect image corresponding to the standard test image to the contrast ratio of the standard test image is taken as the resolution parameter of the 3D display apparatus at the preset viewing distance, and a viewing effect actually felt by the eyes of the viewer may be accurately reflected when the 3D display apparatus displays an image with the preset spatial frequency at the preset viewing distance. Therefore, the resolution parameter of the 3D display apparatus at the preset viewing distance determined through a technical solution of the embodiment of the invention can accurately reflect display quality of the 3D display apparatus. Furthermore, a display effect of the 3D display apparatus can be improved.

In an exemplary embodiment, a quantity of standard test images may be one or more, such as two or three. For example, when the quantity of standard test images is multiple, the standard test images may include a plurality of test images with different preset spatial frequencies. Correspondingly, viewing effect images corresponding to the standard test images may include a plurality of effect images corresponding to the plurality of test images one by one, the plurality of effect images with different spatial frequencies.

In an exemplary embodiment, the standard test image may be a black-and-white line pair image.

In an exemplary embodiment, to accurately reflect a display effect of a 3D display apparatus displaying 3D images of different spatial frequencies, a plurality of black-and-white line pair images of different spatial frequencies may be used as standard test images. Correspondingly, viewing effect images may be the plurality of black-and-white line pair images of different spatial frequencies.

In an exemplary embodiment, a preset spatial frequency may be arbitrarily set by those skilled in the art according to a practical application. For example, the preset spatial frequency may be 1 pixel/line, 2 pixels/line, 3 pixels/line, 4 pixels/line, 5 pixels/line, or the like. The embodiment of the present disclosure is not limited.

Figure 3:
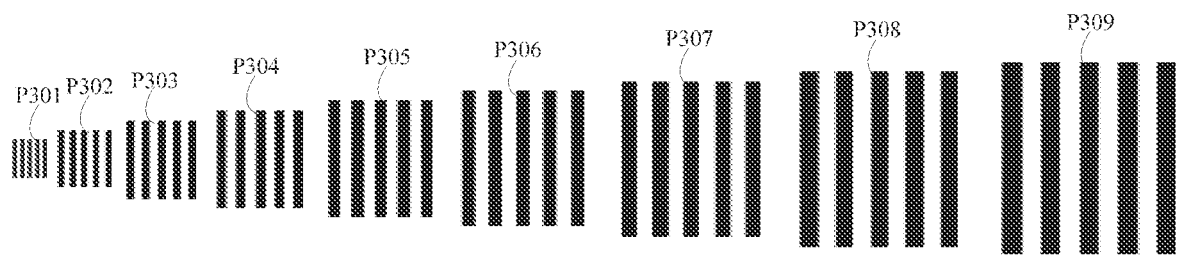
FIG. 3 is a schematic diagram of a standard test image in an embodiment of the present disclosure.

For example, taking the standard test images including 9 black-and-white line pair images with different preset spatial frequencies as an example, 9 standard test images with different spatial frequencies are shown in FIG. 3. As shown in FIG. 3, from left to right, there are: a first standard test image P301 having a spatial frequency of 2 pixels/line, a second standard test image P302 having a spatial frequency of 3 pixels/line, a third standard test image P303 with a spatial frequency of 4 pixels/line, a fourth standard test image P304 with a spatial frequency of 5 pixels/line, a fifth standard test image P305 having a spatial frequency of 6 pixels/line, a sixth standard test image P306 having a spatial frequency of 7 pixels/line, a seventh standard test image P307 having a spatial frequency of 8 pixels/line, an eighth standard test image P308 having a spatial frequency of 9 pixels/line, and a ninth standard test image P309 having a spatial frequency of 10 pixels/line. Of course, a standard test image may also be a standard test image with another spatial frequency, such as a standard test image with a spatial frequency of 1 pixel/line or a standard test image with a spatial frequency of 11 pixels/line. The embodiment of the present disclosure is not limited to this.

In an exemplary embodiment, the resolution parameter may be determined by those skilled in the art by selecting a standard test image with a suitable preset contrast ratio according to a practical application. For example, the resolution parameter may be determined by using a standard test image with a contrast ratio of 1, in this way, it is convenient to quickly determine the resolution parameter, thereby reducing consumption of computing resources.

In an exemplary embodiment, the preset viewing distance may be arbitrarily set according to an optimum viewing distance of the 3D display apparatus. For example, the preset viewing distance may be set to 2 meters or 2.5 meters or the like. The embodiment of the present disclosure is not limited to this.

The following describes how to obtain the contrast ratio of the viewing effect image corresponding to the standard test image based on the standard test image.

Depending on a manner in which the contrast ratio of the viewing effect image is obtained, the act 202 may include, but is not limited to, following two exemplary embodiments.

In one exemplary embodiment, the act 202 may include acts 2021 to 2022 as follows.

Act 2021: obtaining a viewing effect image corresponding to the standard test image based on the standard test image.

Act 2022: determining a contrast ratio of the viewing effect image corresponding to the standard test image based on the viewing effect image corresponding to the standard test image.

For example, taking the quantity of standard test images being multiple as an example, in a product design stage, a plurality of viewing effect images with different spatial frequencies corresponding to a plurality of standard test images may be determined first through the plurality of standard test images, and then contrast ratios of the plurality of viewing effect images are calculated through the obtained plurality of viewing effect images. Of course, in another application scenario, for example, in a product testing stage, a contrast ratio of a viewing effect image may be obtained in this way. The embodiment of the present disclosure is not limited here.

In the other exemplary embodiment, the act 202 may include a following act 2023.

Act 2023: controlling the 3D display apparatus to display the standard test image, and obtaining a contrast ratio of a viewing effect image corresponding to a standard test image measured through a surface-type brightness measuring apparatus.

In an exemplary embodiment, a surface-type brightness measuring apparatus, such as a surface-type brightness meter, may be placed at a position of any one of a plurality of viewpoints formed by any 3D display apparatus, for example, may be placed at a position of a central viewpoint for measurement.

Figure 4A:
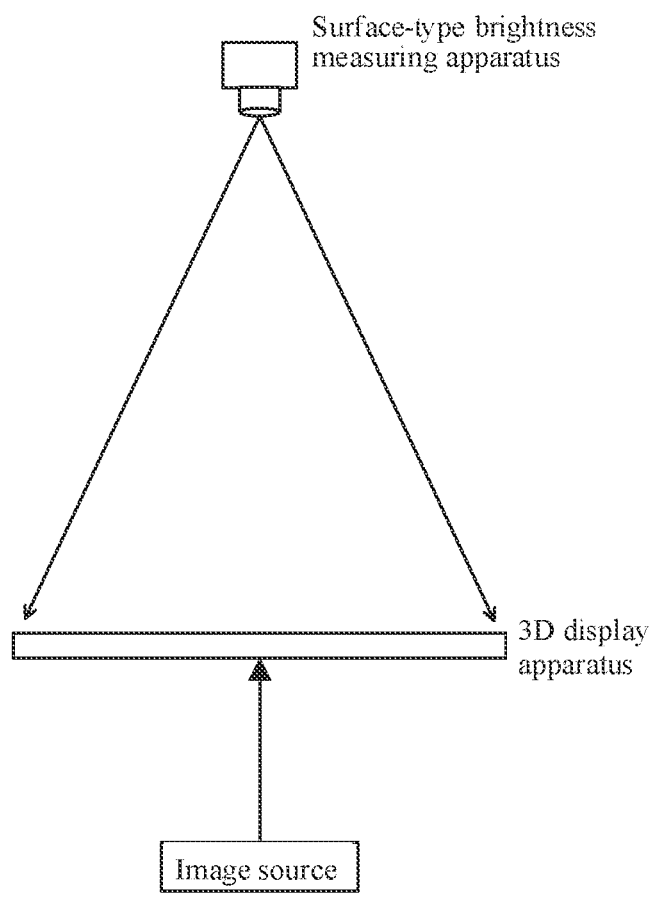
FIG. 4A is a schematic diagram of an application scenario of the parameter determining method in the embodiment of the present disclosure.

For example, taking the quantity of standard test images being multiple as an example, as shown in FIG. 4A, in a product testing stage, a 3D display apparatus may be controlled through an image source to display a plurality of standard test images in turn. Then contrast ratios of a plurality of viewing effect images may be measured in turn through a surface-type brightness measuring apparatus, such as a surface-type brightness meter. Here the image source may generate a plurality of standard test images and send the plurality of standard test images to the 3D display apparatus for display.

Of course, in addition to the two methods listed above for obtaining a contrast ratio of a viewing effect image, another method may be adopted. The embodiment of the present disclosure is not limited here.

The following describes how to obtain the viewing effect image corresponding to the standard test image based on the standard test image.

In one exemplary embodiment, the act 2021 may include following acts 2021a to 2021b.

Act 2021a: obtaining a plurality of image misalignment parameters and a plurality of crosstalk energy parameters corresponding to a plurality of viewpoints of the 3D display apparatus.

Act 2021b: performing crosstalk superposition on the standard test image to obtain the viewing effect image corresponding to the standard test image based on the plurality of image misalignment parameters and the plurality of crosstalk energy parameters corresponding to the plurality of viewpoints.

For example, in a product design stage, a plurality of image misalignment parameters and a plurality of crosstalk energy parameters corresponding to a plurality of viewpoints of a 3D display apparatus to be tested may be obtained first, and then crosstalk superposition is performed on a standard test image through the plurality of image misalignment parameters and the plurality of crosstalk energy parameters corresponding to the plurality of viewpoints to obtain a viewing effect image corresponding to the standard test image. Of course, in another application scenario, for example, in a product testing stage, a viewing effect image may be obtained in this way. The embodiment of the present disclosure is not limited here.

In the other exemplary embodiment, the act 2021 may include an act 2021c.

Act 2021c: controlling the 3D display apparatus to display the standard test image, and obtaining a viewing effect image corresponding to a standard test image acquired by an image acquisition apparatus.

Figure 4B:
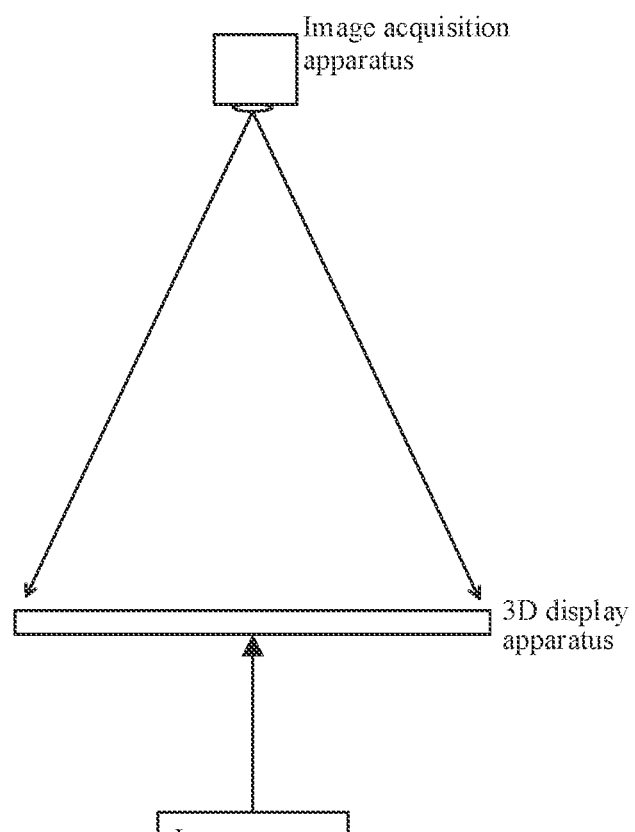
FIG. 4B is a schematic diagram of another application scenario of the parameter determining method in the embodiment of the present disclosure.

For example, taking the quantity of standard test images being multiple as an example, as shown in FIG. 4B, in a product testing stage, a 3D display apparatus may be controlled through an image source to display a plurality of standard test images in turn, and then a plurality of viewing effect images may be acquired in turn through an image acquisition apparatus, such as a camera. Here the image acquisition apparatus may be placed at a position of any one of a plurality of viewpoints formed by an arbitrary 3D display apparatus, for example, at a position of a central viewpoint for acquisition. Here, the image source may generate a plurality of standard test images and send the plurality of standard test images to the 3D display apparatus for display.

Of course, in addition to the two methods of obtaining a viewing effect image listed above, another method may be adopted, and the embodiment of the present disclosure is not limited here.

In an exemplary embodiment, the act 2021a may include acts a1 to a3.

Act a1: obtaining a plurality of white light brightness curves corresponding to a plurality of viewpoints, wherein a white light brightness curve corresponding to each viewpoint is a brightness curve obtained when a pixel corresponding to the viewpoint displays a white picture and other pixels other than the pixel corresponding to the viewpoint display a black picture in the 3D display apparatus.

Act a2: determining a plurality of crosstalk energy parameters corresponding to the plurality of viewpoints based on the plurality of white light brightness curves corresponding to the plurality of viewpoints, wherein a crosstalk energy parameter corresponding to each viewpoint is a sum of ratios of energy of the viewpoint to which adjacent viewpoints of the viewpoint bring crosstalk.

Act a3: determining the plurality of image misalignment parameters corresponding to the plurality of viewpoints based on the preset viewing distance.

In an exemplary embodiment, the act a1 may include: for each viewpoint, controlling a pixel corresponding to the viewpoint in the 3D display apparatus to display a white picture and other pixels other than the pixel corresponding to the viewpoint to display a black picture through optical simulation software to simulate and obtain a white light brightness curve corresponding to each viewpoint.

For example, in a product design stage, optical performance of a designed 3D display apparatus may be simulated by using optical simulation software to simulate and obtain a white light brightness curve corresponding to each viewpoint.

In another exemplary embodiment, the act a1 may include: for each viewpoint, controlling a pixel corresponding to the viewpoint in the 3D display apparatus to display a white picture and other pixels other than the pixel corresponding to the viewpoint to display a black picture, and obtaining a white light brightness curve corresponding to each viewpoint measured through a point-type brightness measuring apparatus.

Figure 4C:
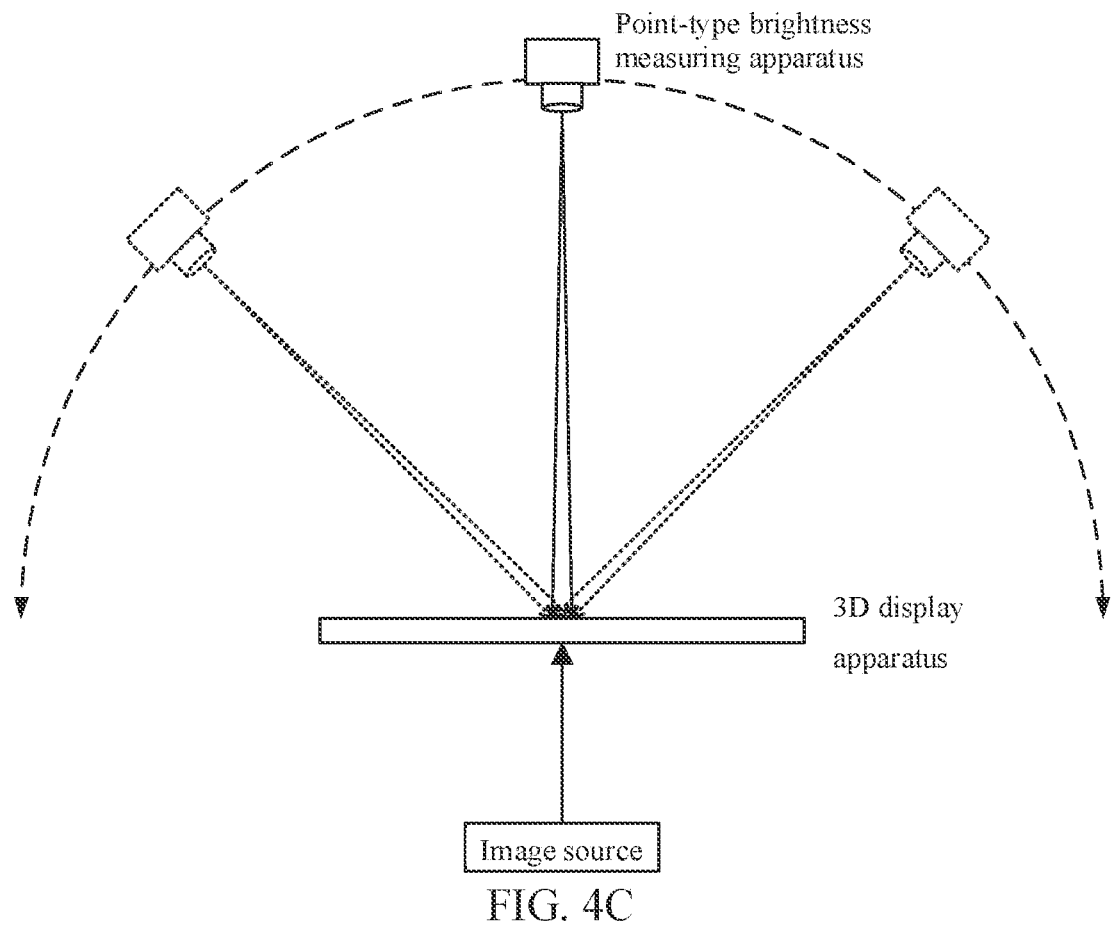
FIG. 4C is a schematic diagram of yet another application scenario of the parameter determining method in the embodiment of the present disclosure.

For example, as shown in FIG. 4C, in a product testing stage, an image source drives a 3D display apparatus to display a picture in which a pixel corresponding to a first viewpoint is all white and pixels corresponding to other viewpoints are all black, and brightness of the display apparatus at multiple angles is scanned by using a point-type brightness measuring apparatus (such as a point-type brightness meter) combined with an angle scanning device to obtain a white light brightness curve of the first viewpoint. Then, the image source drives the 3D display apparatus to display a picture in which a pixel corresponding to a second viewpoint is all white and pixels corresponding to other viewpoints are all black, and brightness of the 3D display apparatus at multiple angles is scanned by using a point-type brightness measuring apparatus (such as a point-type brightness meter) combined with an angle scanning device to obtain a white light brightness curve of the second viewpoint. By analogy, white light brightness curves of all viewpoints may be obtained in turn. Here, the image source may sequentially generate a picture in which a pixel corresponding to a first viewpoint is all white and pixels corresponding to other viewpoints are all black, a picture in which a pixel corresponding to a second viewpoint is all white and pixels corresponding to other viewpoints are all black, a picture in which a pixel corresponding to a third viewpoint is all white and pixels corresponding to other viewpoints are all black, etc., and send these pictures to the 3D display apparatus for display.

For example, still taking the white light brightness curves of multiple viewpoints as shown in FIG. 1D and adjacent viewpoints of the first viewpoint A including the second viewpoint B, the third viewpoint B', the fourth viewpoint C, the fifth viewpoint C', the sixth viewpoint D, the seventh viewpoint D', the eighth viewpoint E, and the ninth viewpoint E' as an example, wherein energy of the first viewpoint A to which each of the second viewpoint B and the third viewpoint B' brings crosstalk reaches 85% of energy of the first viewpoint A, energy of the first viewpoint A to which each of the fourth viewpoint C and the fifth viewpoint C' brings crosstalk reaches 52% of the energy of the first viewpoint A, energy of the first viewpoint A to which each of the sixth viewpoint D and the seventh viewpoint D' brings crosstalk reaches 23% of the energy of the first viewpoint A, energy of the first viewpoint A to which each of the eighth viewpoint E and the ninth viewpoint E' brings crosstalk reaches 7% of the energy of the first viewpoint A, then 85%+85%+52%+52%+23%+23%+7%+7%=334%, and it may be obtained that a sum of crosstalk energy ratios of the first viewpoint A to which the adjacent viewpoints of the first viewpoint A bring crosstalk is equal to 334%, that is, a crosstalk energy parameter corresponding to the first viewpoint A is 334%. Similarly, a plurality of crosstalk energy parameters corresponding to a plurality of viewpoints may be calculated.

In an exemplary embodiment, the act a3 may include: obtaining a parallax angle of the viewer and a quantity of viewpoints between two eyes of the viewer at the preset viewing distance; according to the preset viewing distance, the parallax angle of the viewer at the preset viewing distance, and the quantity of viewpoints between two eyes of the viewer, calculating the plurality of image misalignment parameters corresponding to the plurality of viewpoints through following formulas (3) to (5)

$$\Delta D = L \times \tan(\Delta\theta) \qquad \text{formula (3)}$$

$$\delta = \frac{\Delta D}{N} \qquad \text{formula (4)}$$

$$D_n = \text{round}\left(\frac{n \times \delta}{\text{d\_pixel}}\right) \qquad \text{formula (5)}$$

Among them, L represents the preset viewing distance, $\Delta\theta$ represents the parallax angle of the viewer at the preset viewing distance (for example, as shown in FIG. 1A, $\Delta\theta$ is a flare angle of misalignment of images viewed by two eyes of the viewer on the screen to human eyes at the preset viewing distance), N represents the quantity of viewpoints between two eyes of the viewer at the preset viewing distance, tan(•) represents a tangent function, $D_n$ represents an image misalignment parameter corresponding to a n-th viewpoint (that is, a distance of image misalignment expressed in 3D pixels), d_pixel represents a width of a 3D pixel in the 3D display apparatus, round(•) represents a rounding operation, $\Delta D$ represents a line distance of misalignment of images viewed by two eyes of the viewer on a screen at the preset viewing distance, and $\delta$ represents a line distance of misalignment of images of adjacent viewpoints between two eyes of the viewer at the preset viewing distance.

For example, taking the adjacent viewpoints of the first viewpoint A including the second viewpoint B, the third viewpoint B', the fourth viewpoint C, the fifth viewpoint C', the sixth viewpoint D, the seventh viewpoint D', the eighth viewpoint E, and the ninth viewpoint E' as an example, the first viewpoint A may be denoted as a fifth viewpoint in the 3D display apparatus, and then n equals 5. Similarly, the plurality of image misalignment parameters corresponding to the plurality of viewpoints may be calculated through the above formulas (3) to (5).

In an exemplary embodiment, the act 2021b may include: translating the standard test image using an image misalignment parameter corresponding to each viewpoint as a translation distance to obtain a translated first image corresponding to each viewpoint; multiplying the translated first image corresponding to each viewpoint by a crosstalk energy parameter corresponding to each viewpoint to obtain a second image after crosstalk corresponding to each viewpoint, wherein the crosstalk energy parameter corresponding to each viewpoint is a sum of ratios of energy of the viewpoint to which adjacent viewpoints of the viewpoint bring crosstalk; and superimposing the second image after crosstalk corresponding to each viewpoint on the standard test image to obtain a viewing effect image corresponding to the standard test image.

For example, as shown in FIG. 3, taking the standard test image including nine black-and-white line pair images with different preset spatial frequencies as an example, the plurality of standard test images may include: a first standard test image P301 with a spatial frequency of 2 pixels/line, a second standard test image P302 with a spatial frequency of 3 pixels/line, a third standard test image P303 with a spatial frequency of 4 pixels/line, a fourth standard test image P304 with a spatial frequency of 5 pixels/line, a fifth standard test image P305 with a spatial frequency of 6 pixels/line, a sixth standard test image P306 with a spatial frequency of 7 pixels/line, a seventh standard test image P307 with a spatial frequency of 8 pixels/line, an eighth standard test image P308 with a spatial frequency of 9 pixels/line, and a ninth standard test image P309 with a spatial frequency of 10 pixels/line. And taking the plurality of viewpoints including the first viewpoint A, the second viewpoint B, the third viewpoint B', the fourth viewpoint C, the fifth viewpoint C', the sixth viewpoint D, the seventh viewpoint D', the eighth viewpoint E, and the ninth viewpoint E' as an example, a process of crosstalk superposition on the first standard test image P301 may include: translating the first standard test image P301 using an image misalignment parameter corresponding to the first viewpoint A as a translation distance to obtain a translated first image corresponding to the first viewpoint A, and multiplying the translated first image corresponding to the first viewpoint A by a crosstalk energy parameter corresponding to the first viewpoint A to obtain a second image after crosstalk corresponding to the first viewpoint A. And then, by analogy, a second image after crosstalk corresponding to the second viewpoint B, a second image after crosstalk corresponding to the third viewpoint B', a second image after crosstalk corresponding to the fourth viewpoint C, a second image after crosstalk corresponding to the fifth viewpoint C', a second image after crosstalk corresponding to the sixth viewpoint D, a second image after crosstalk corresponding to the seventh viewpoint D', a second image after crosstalk corresponding to the eighth viewpoint E, and a second image after crosstalk corresponding to the ninth viewpoint E' are obtained in turn. Finally, a plurality of second images after crosstalk corresponding to the nine viewpoints respectively are superimposed on the first standard test image P301 to obtain a viewing effect image P401 corresponding to the first standard test image.

Figure 5:
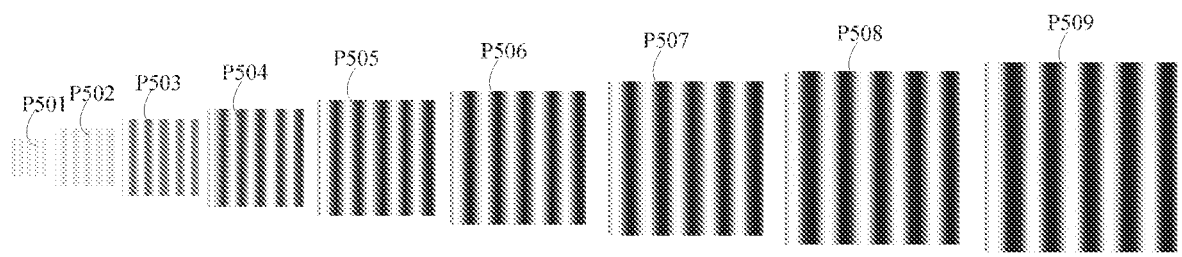
FIG. 5 is a schematic diagram of a viewing effect image in an embodiment of the present disclosure.

By analogy, according to the plurality of image misalignment parameters and the plurality of crosstalk energy parameters corresponding to the plurality of viewpoints, crosstalk superposition is performed respectively on each standard test image in standard test images of 9 different spatial frequencies as shown in FIG. 3, viewing effect images of 9 different spatial frequencies as shown in FIG. 5 (corresponding to standard test images of 9 different spatial frequencies as shown in FIG. 3) may be obtained. As shown in FIG. 5, from left to right, there are: a first viewing effect image P501 with a spatial frequency of 2 pixels/line, a second viewing effect image P502 with a spatial frequency of 3 pixels/line, a third viewing effect image P503 with a spatial frequency of 4 pixels/line, a fourth viewing effect image P504 with a spatial frequency of 5 pixels/line, a fifth viewing effect image P505 with a spatial frequency of 6 pixels/line, a sixth viewing effect image P506 with a spatial frequency of 7 pixels/line, a seventh viewing effect image P507 with a spatial frequency of 8 pixels/line, an eighth viewing effect image P508 with a spatial frequency of 9 pixels/line, and a ninth viewing effect image P509 with a spatial frequency of 10 pixels/line. Here, due to an influence of crosstalk, when the 3D display apparatus displays the standard test images as shown in FIG. 3, what the viewer's eyes actually see through the 3D display apparatus at the preset viewing distance may be the effect images as shown in FIG. 5, and an image actually seen by the viewer's eyes becomes blurred and a contrast ratio decreases.

In addition, a spatial frequency of a viewing effect image is determined by a spatial frequency of a standard test image used. Therefore, depending on a different spatial frequency of a standard test image used, it may also be a viewing effect image with another spatial frequency, such as a viewing effect image with a spatial frequency of 1 pixel/line or a viewing effect image with a spatial frequency of 11 pixels/line, and the embodiment of the present disclosure is not limited to this.

In an exemplary embodiment, the act 2022 may include following acts 2022a to 2022b.

Act 2022a: obtaining a maximum gray value and a minimum gray value in the viewing effect image corresponding to the standard test image.

Act 2022b: based on the maximum gray value (brightness of a brightest pixel) and the minimum gray value (brightness of a darkest pixel) in the viewing effect image corresponding to the standard test image, calculating a contrast ratio of the viewing effect image corresponding to the standard test image through a following formula (6).

$$C = \frac{I_{max} - I_{min}}{I_{max} + I_{min}} \quad \text{formula (6)}$$

Among them, C represents the contrast ratio, $I_{max}$ represents the maximum gray value, and $I_{min}$ represents the minimum gray value.

Similarly, a contrast ratio of the standard test image may be calculated through the above formula (6). For example, a maximum gray value and a minimum gray value corresponding to each standard test image are obtained from each standard test image, and a contrast ratio of each standard test image may be calculated according to the maximum gray value and the minimum gray value corresponding to each standard test image through the above formula (6).

In an exemplary embodiment, after the act 203, the parameter determining method may further include a following act.

Act 204: determining whether stereoscopic display quality of the 3D display apparatus is qualified based on whether a resolution parameter at the preset viewing distance is greater than a preset resolution threshold.

For example, in a product design stage or a product testing stage of the 3D display apparatus, after determining the resolution parameter of the 3D display apparatus at the preset viewing distance, it is possible to determine whether the stereoscopic display quality of the 3D display apparatus is qualified based on whether the resolution parameter at the preset viewing distance is greater than the preset resolution threshold.

In an exemplary embodiment, human eyes are more sensitive to a spatial frequency of 1 to 4 cycles per degree (cpd) according to contrast ratio sensitivity characteristic of the human eyes (i.e., visual special effects of the human eyes), then the preset spatial frequency may be 1 to 4 cpd and the preset resolution threshold may be 0.5.

Figure 6A:
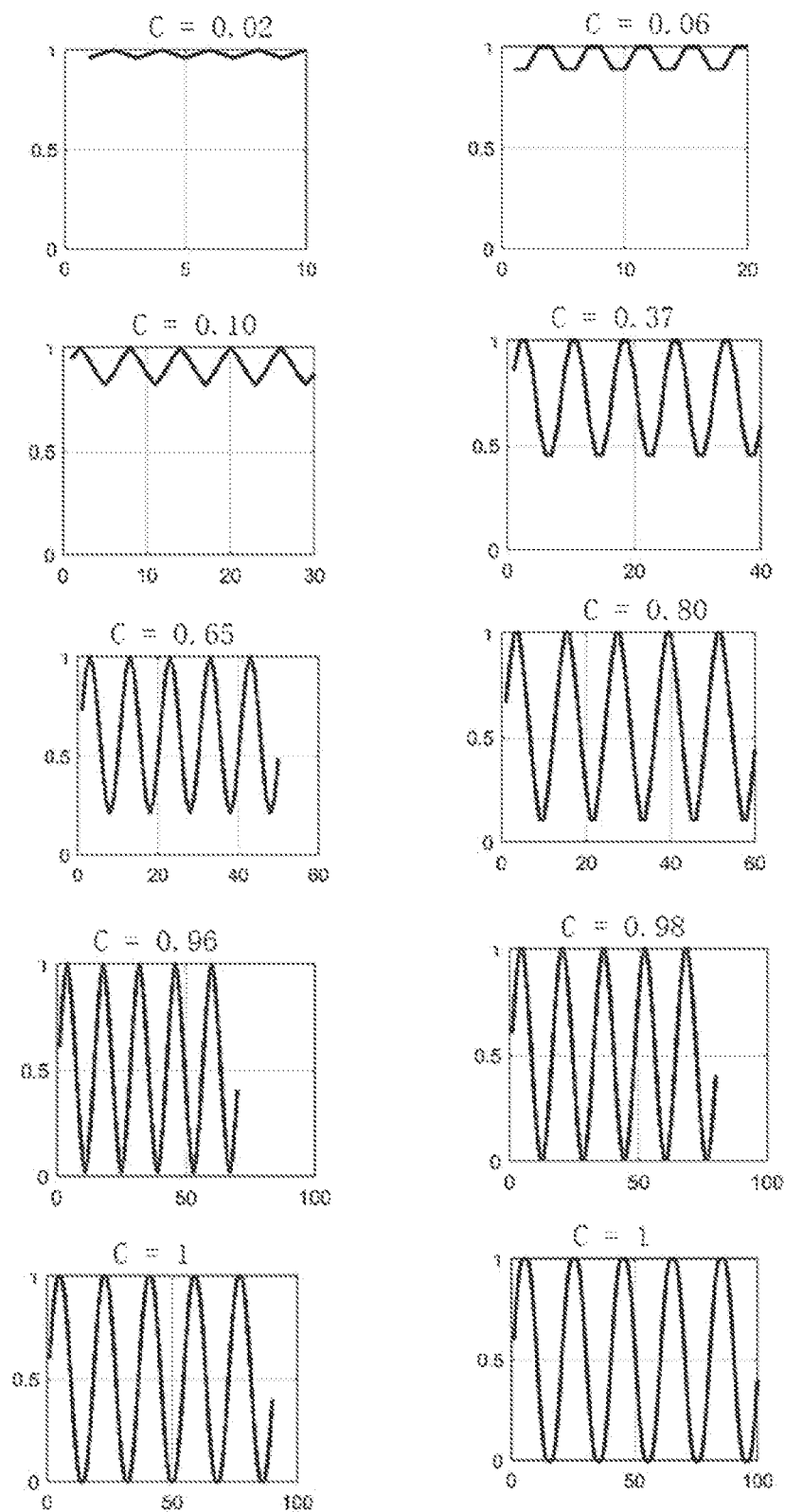
FIG. 6A is a schematic diagram of a gray value distribution curve of a line pair in a viewing effect image in an embodiment of the present disclosure.

For example, gray value distribution curves of line pairs in viewing effect images of 10 different spatial frequencies (1 pixel/line to 10 pixels/line, respectively) at the preset viewing distance are illustrated in FIG. 6A, and contrast ratios C of the viewing effect images of the 10 different spatial frequencies are illustrated. Among them, as shown in FIG. 6A, a contrast ratio C of a 1 pixel/line viewing effect image is 0.02, a contrast ratio C of a 2 pixels/line viewing effect image is 0.06, a contrast ratio C of a 3 pixels/line viewing effect image is 0.10, a contrast ratio C of a 4 pixels/line viewing effect image is 0.37, a contrast ratio C of a 5 pixels/line viewing effect image is 0.65, a contrast ratio C of a 6 pixels/line viewing effect image is 0.80, a contrast ratio C of a 7 pixels/line viewing effect image is 0.96, a contrast ratio C of a 8 pixels/line viewing effect image is 0.98, a contrast ratio C of a 9 pixels/line viewing effect image is 1, and a contrast ratio C of a 10-pixels/line viewing effect image is 1. Here, in FIG. 6A, an abscissa is a position of a line, and an ordinate is a gray value, wherein a value range of the gray value is normalized to 0 to 1.

Figure 6B:
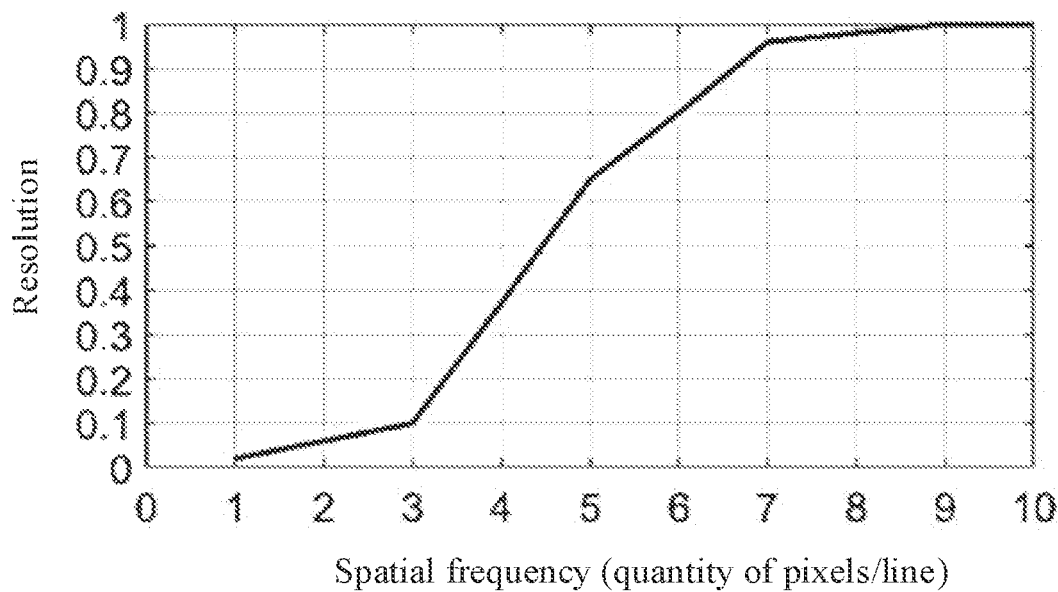
FIG. 6B is a schematic diagram of a resolution parameter curve in an embodiment of the present disclosure.

For example, taking contrast ratios of standard test images of different spatial frequencies being all 1 as an example, resolution parameters of different spatial frequencies of the 3D display apparatus at the preset viewing distance is equal to contrast ratios C of viewing effect images of different spatial frequencies at the preset viewing distance. Then, by connecting contrast ratios of viewing effect images of all spatial frequencies at the preset viewing distance shown in FIG. 6A, resolution parameter curves of the 3D display apparatus at the preset viewing distance as shown in FIG. 6B may be obtained. Here, in FIG. 6B, an abscissa is a spatial frequency, a unit of the spatial frequency is a quantity of pixels/line, an ordinate is a resolution parameter, and a value range of the resolution parameter is 0 to 1.

Figure 6C:
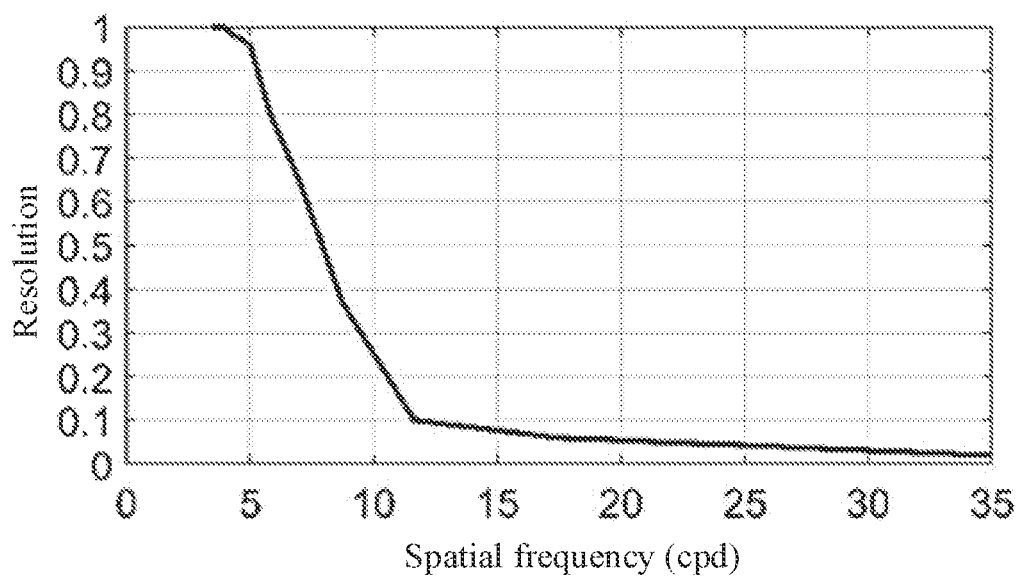
FIG. 6C is another schematic diagram of a resolution parameter curve in an embodiment of the present disclosure.

Then, considering visual characteristics of human eyes, cpd is usually used as a unit of a spatial frequency, while a quantity of pixels/line is usually used as a spatial frequency when a standard test image is implemented as a black-and-white line pair image, and unit conversion of a spatial frequency may be performed through a correspondence shown in a following formula (7). For example, taking L=2000 millimeters (mm) and d_pixel=0.5 mm as an example, a resolution parameter curve of the 3D display apparatus shown in FIG. 6B may be converted to obtain a converted resolution parameter curve of the 3D display apparatus shown in FIG. 6C. In FIG. 6C, an abscissa is a spatial frequency, a unit of the spatial frequency is cpd, an ordinate is a resolution parameter, and a value range of the resolution parameter is 0 to 1.

$$cpd = (L \times \tan 1°)/(2 \times d\_pixel \times \text{a quantity of pixels/line}) \quad \text{formula (7)}$$

Among them, L represents a viewing distance, and d_pixel represents a width of a 3D pixel in the 3D display apparatus.

In an exemplary embodiment, to comprehensively evaluate display quality of the 3D display apparatus, a plurality of sets of viewing effect images at different viewing distances corresponding to the plurality of standard test images of different spatial frequencies may be obtained based on the plurality of standard test images, each set of viewing effect images including a plurality of viewing effect images corresponding to the plurality of standard test images, and a plurality of sets of resolution parameters at different viewing distances may be obtained based on contrast ratios of the plurality of standard test images and contrast ratios of the plurality of sets of viewing effect images at different viewing distances. Finally, multiple resolution curves at different viewing distances may be obtained by connecting each set of resolution parameters.

Figure 6D:
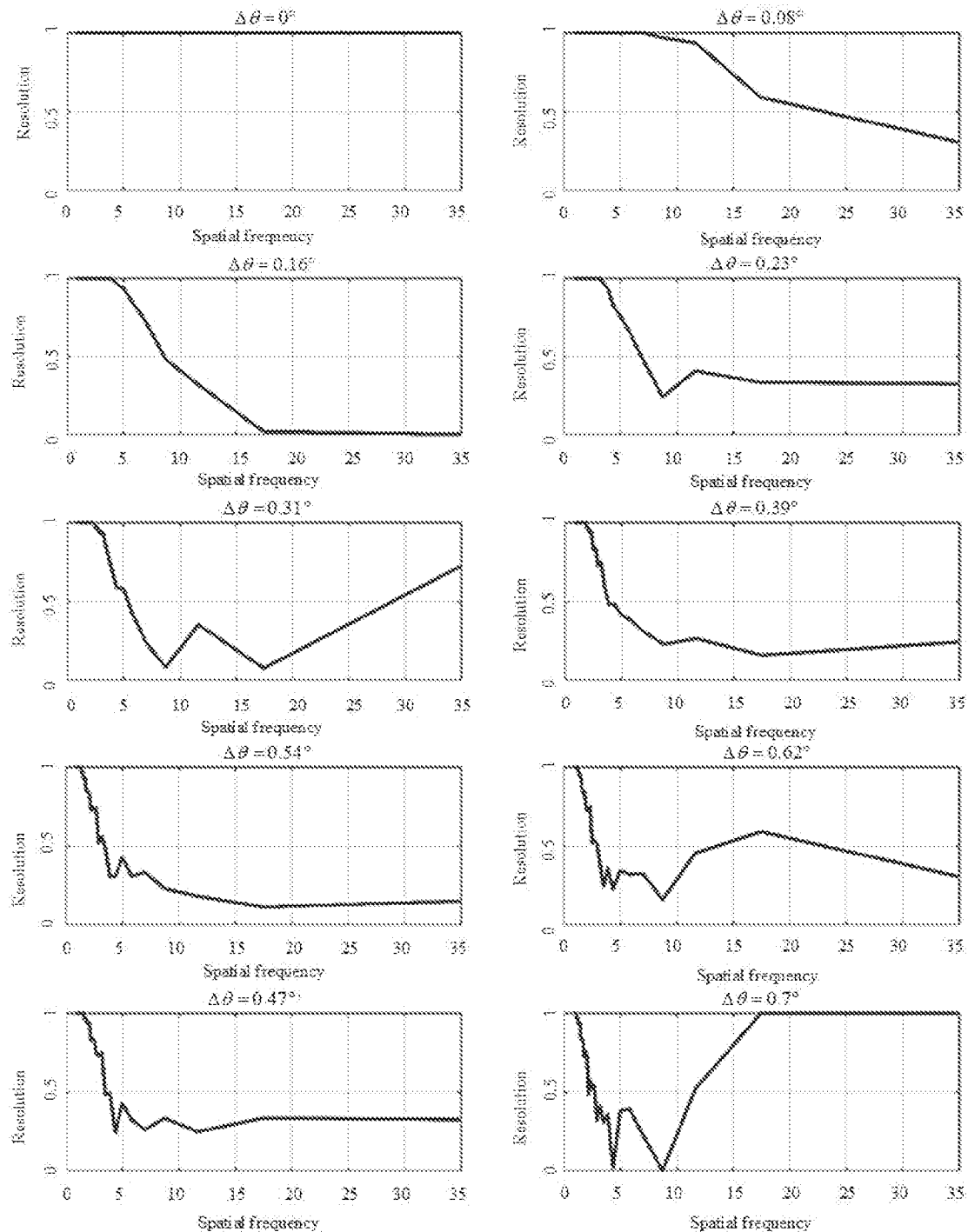
FIG. 6D is yet another schematic diagram of a resolution parameter curve in an embodiment of the present disclosure.

For example, resolution parameter curves at ten different preset viewing distances are illustrated in FIG. 6D, and flare angles Δθ of misalignment of left and right eye images on a screen to a human eye at ten different preset viewing distances are illustrated. Among them, as shown in FIG. 6D, a human eye flare angle Δθ corresponding to a first resolution curve is equal to 0°, a human eye flare angle Δθ corresponding to a second resolution curve is equal to 0.08°, a human eye flare angle Δθ corresponding to a third resolution curve is equal to 0.16°, a human eye flare angle Δθ corresponding to a fourth resolution curve is equal to 0.23°, a human eye flare angle Δθ corresponding to a fifth resolution curve is equal to 0.31°, a human eye flare angle Δθ corresponding to a sixth resolution curve is equal to 0.39°, a human eye flare angle Δθ corresponding to a seventh resolution curve is equal to 0.54°, a human eye flare angle Δθ corresponding to an eighth resolution curve is equal to 0.62°, a human eye flare angle Δθ corresponding to a ninth resolution curve is equal to 0.47°, and a human eye flare angle Δθ corresponding to a tenth resolution curve is equal to 0.7°. Here, in FIG. 6D, an abscissa is a spatial frequency, a unit of the spatial frequency is cpd, an ordinate is a resolution parameter, and a value range of the resolution parameter is 0 to 1.

For example, a human eye is more sensitive to a spatial frequency of 1 to 4 cpd according to contrast sensitivity characteristics of the human eye. Thus, a resolution within 1 to 4 cpd may be set to be greater than 0.5 to be used as a benchmark for evaluating the display quality of the 3D display apparatus. Then, it may be seen from resolution curves shown in FIG. 6D that when Δθ>0.39°, a resolution within 1 to 4 cpd is not greater than 0.5, indicating that quality of a 3D image seen by the human eye at this time does not meet this evaluation benchmark. Therefore, a maximum flare angle of misalignment of left and right eye images of a 3D scenario that this 3D display apparatus can display to the human eye is 0.39°. For example, it may be calculated through the formulas (1) to (2) that when a viewing distance L=2000 mm, a corresponding out-of-screen distance $L_F$=−346 mm, and a corresponding in-screen distance $L_B$=528 mm.

An embodiment of the present disclosure provides an electronic device, and the electronic device may include: a processor, a memory, and a computer program stored in the memory and runnable on the processor, wherein acts of the parameter determining method in any of the above embodiments of the present disclosure are implemented when the processor executes the program.

Figure 7:
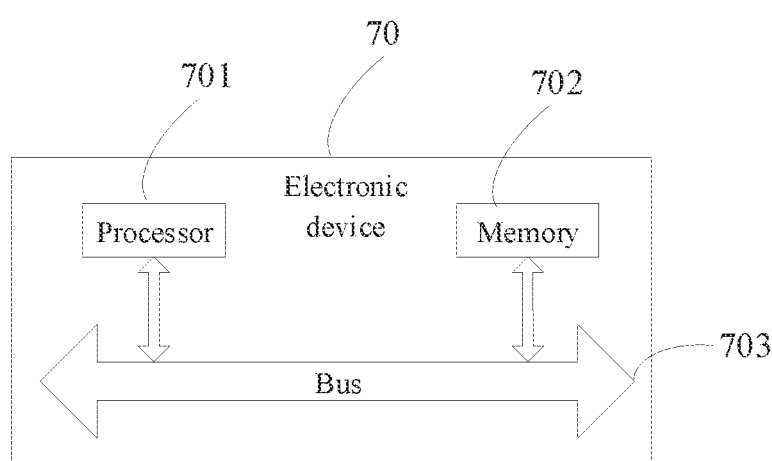
FIG. 7 is a schematic diagram of a structure of an electronic device according to an embodiment of the present disclosure.

In an exemplary embodiment, FIG. 7 is a schematic diagram of a structure of an electronic device in an embodiment of the present disclosure. As shown in FIG. 7, an electronic device 70 includes at least one processor 701, at least one memory 702 connected with the processor 701, and a bus 703. Among them, the processor 701 and the memory 702 communicate with each other through the bus 703. The processor 701 is configured to invoke program instructions in the memory 702 to perform the acts of the parameter determining method in any of the above embodiments.

A processor may be a Central Processing Unit (CPU), a Micro Processor Unit (MPU), a Digital Signal Processor (DSP), an Application Specific Integrated Circuit (ASIC), a Field Programmable Gate Array (FPGA), and a transistor logic apparatus, etc., which is not limited in the present disclosure.

A memory may include a Read Only Memory (ROM) and a Random Access Memory (RAM), and provides instructions and data to the processor. A part of the memory may further include a non-volatile random access memory. For example, the memory may further store information of a device type.

Besides a data bus, a bus may further include a power bus, a control bus, and a status signal bus, etc. However, for clarity of illustration, various buses are labeled as the bus 703 in FIG. 7.

The present disclosure also provides a non-transient computer-readable storage medium including a stored program, wherein the acts of the parameter determining method in any of the above embodiments are implemented when the program is run.

In an exemplary embodiment, the above-mentioned computer-readable storage medium may be, for example, a ROM/RAM, a magnetic disk, or an optical disk, which is not limited in the present disclosure.

It may be understood by those of ordinary skill in the art that all or some acts in a method and function modules/units in a system and an apparatus disclosed above may be implemented as software, firmware, hardware, and appropriate combinations thereof. In a hardware implementation mode, division of the function modules/units mentioned in the above description is not always corresponding to division of physical components. For example, a physical component may have multiple functions, or a function or an act may be executed by several physical components in cooperation. Some components or all components may be implemented as software executed by a processor such as a digital signal processor or a microprocessor, or implemented as hardware, or implemented as an integrated circuit such as an application specific integrated circuit. Such software may be distributed in a computer-readable medium, and the computer-readable medium may include a computer storage medium (or a non-transitory medium) and a communication medium (or a transitory medium). As known to those of ordinary skill in the art, a term computer storage medium includes volatile and nonvolatile, and removable and irremovable media implemented in any method or technology for storing information (for example, computer-readable instructions, a data structure, a program module, or other data). The computer storage medium includes, but is not limited to, a Random Access Memory (RAM), a Read Only Memory (ROM), an Electrically Erasable Programmable Read Only Memory (EEPROM), a Flash RAM, or another memory technology, a Compact Disc Read Only Memory (CD-ROM), a Digital Versatile Disk (DVD) or another optical disk storage, a magnetic box, a magnetic tape, magnetic disk storage or another magnetic storage apparatus, or any other media that may be used for storing desired information and may be accessed by a computer. In addition, it is known to those of ordinary skill in the art that the communication medium usually includes computer-readable instructions, a data structure, a program module, or other data in a modulated data signal of, such as, a carrier or another transmission mechanism, and may include any information delivery medium.

Although the implementation modes disclosed in the present disclosure are as above, the described contents are only implementation modes used for convenience of understanding the present disclosure and are not intended to limit the present disclosure. Any person skilled in the art to which the present disclosure pertains may make any modifications and variations in a form and details of implementation without departing from the spirit and the scope of the present disclosure, but the protection scope of the present disclosure shall still be subject to the scope defined in the appended claims.

The invention claimed is:

1. A parameter determining method, comprising:
obtaining a standard test image with a preset spatial frequency and a contrast ratio of the standard test image;
obtaining a contrast ratio of a viewing effect image corresponding to the standard test image based on the standard test image, wherein the viewing effect image corresponding to the standard test image is an image that a viewer is able to view through a three-dimensional (3D) display apparatus at a preset viewing distance when the 3D display apparatus displays the standard test image; and
calculating a ratio of the contrast ratio of the viewing effect image corresponding to the standard test image to the contrast ratio of the standard test image, and determining a resolution parameter at the preset viewing distance, wherein the resolution parameter at the preset viewing distance is used for representing stereoscopic display quality when the 3D display apparatus displays an image with the preset spatial frequency at the preset viewing distance.

2. The method according to claim 1, wherein the standard test image comprises a plurality of test images with different preset spatial frequencies, and the viewing effect image corresponding to the standard test image comprises a plurality of effect images corresponding to the plurality of test images one by one, and the plurality of effect images have different spatial frequencies.

3. The method according to claim 1, wherein the standard test image comprises a black-and-white line pair image.

4. The method according to claim 1, wherein the obtaining the contrast ratio of the viewing effect image corresponding to the standard test image based on the standard test image comprises:
obtaining the viewing effect image corresponding to the standard test image based on the standard test image; and
determining the contrast ratio of the viewing effect image corresponding to the standard test image based on the viewing effect image corresponding to the standard test image.

5. The method according to claim 4, wherein the determining the contrast ratio of the viewing effect image corresponding to the standard test image based on the viewing effect image corresponding to the standard test image comprises:
obtaining a maximum gray value and a minimum gray value in the viewing effect image corresponding to the standard test image;
based on the maximum gray value and the minimum gray value in the viewing effect image corresponding to the standard test image, calculating the contrast ratio of the viewing effect image corresponding to the standard test image through a following formula:

$$C = \frac{I_{max} - I_{min}}{I_{max} + I_{min}}$$

wherein C represents the contrast ratio, $I_{max}$ represents the maximum gray value, and $I_{min}$ represents the minimum gray value.

6. The method according to claim 4, wherein the obtaining the viewing effect image corresponding to the standard test image based on the standard test image comprises:
obtaining a plurality of image misalignment parameters and a plurality of crosstalk energy parameters corresponding to a plurality of viewpoints of the 3D display apparatus, wherein a crosstalk energy parameter corresponding to each viewpoint is a sum of ratios of energy of the viewpoint to which adjacent viewpoints of the viewpoint bring crosstalk; and
performing crosstalk superposition on the standard test image to obtain the viewing effect image corresponding to the standard test image based on the plurality of image misalignment parameters and the plurality of crosstalk energy parameters corresponding to the plurality of viewpoints.

7. The method according to claim 6, wherein the performing crosstalk superposition on the standard test image to obtain the viewing effect image corresponding to the standard test image based on the plurality of image misalignment parameters and the plurality of crosstalk energy parameters corresponding to the plurality of viewpoints comprises:
translating the standard test image using an image misalignment parameter corresponding to each viewpoint as a translation distance, to obtain a translated first image corresponding to each viewpoint;
multiplying the translated first image corresponding to each viewpoint by a crosstalk energy parameter corresponding to each viewpoint to obtain a second image after crosstalk corresponding to each viewpoint; and
superimposing the second image after crosstalk corresponding to each viewpoint on the standard test image to obtain the viewing effect image corresponding to the standard test image.

8. The method according to claim 6, wherein the obtaining the plurality of image misalignment parameters and the plurality of crosstalk energy parameters corresponding to the plurality of viewpoints of the 3D display apparatus comprises:
obtaining a plurality of white light brightness curves corresponding to the plurality of viewpoints, wherein a white light brightness curve corresponding to each viewpoint is a brightness curve obtained when a pixel corresponding to the viewpoint displays a white picture and other pixels other than the pixel corresponding to the viewpoint display a black picture in the 3D display apparatus;
determining the plurality of crosstalk energy parameters corresponding to the plurality of viewpoints according to the plurality of white light brightness curves corresponding to the plurality of viewpoints; and
determining the plurality of image misalignment parameters corresponding to the plurality of viewpoints based on the preset viewing distance.

9. The method according to claim 8, wherein the determining the plurality of image misalignment parameters corresponding to the plurality of viewpoints based on the preset viewing distance comprises:
obtaining a parallax angle of the viewer and a quantity of viewpoints between two eyes of the viewer at the preset viewing distance;
according to the preset viewing distance, the parallax angle of the viewer at the preset viewing distance, and the quantity of viewpoints between two eyes of the viewer, calculating the plurality of image misalignment parameters corresponding to the plurality of viewpoints through following formulas:

$$\Delta D = L \times \tan(\Delta\theta)$$
$$\delta = \frac{\Delta D}{N}$$
$$D_n = \text{round}\left(\frac{n \times \delta}{\text{d\_pixel}}\right)$$

wherein L represents the preset viewing distance, $\Delta\theta$ represents the parallax angle of the viewer at the preset viewing distance, N represents the quantity of viewpoints between two eyes of the viewer at the preset viewing distance, $\tan(\cdot)$ represents a tangent function, $D_n$ represents an image misalignment parameter corresponding to a n-th viewpoint, d_pixel represents a width of a 3D pixel in the 3D display apparatus, and round($\cdot$) represents a rounding operation.

10. The method according to claim 8, wherein the obtaining the plurality of white light brightness curves corresponding to the plurality of viewpoints comprises:
for each viewpoint, controlling a pixel corresponding to the viewpoint in the 3D display apparatus to display a white picture and other pixels other than the pixel corresponding to the viewpoint to display a black picture, and obtaining a white light brightness curve corresponding to each viewpoint measured through a point-type brightness measuring apparatus.

11. The method according to claim 4, wherein the obtaining the viewing effect image corresponding to the standard test image based on the standard test image comprises:
controlling the 3D display apparatus to display the standard test image, and obtaining the viewing effect image corresponding to the standard test image acquired through an image acquisition apparatus.

12. The method according to claim 1, wherein the obtaining the contrast ratio of the viewing effect image corresponding to the standard test image based on the standard test image comprises:
controlling the 3D display apparatus to display the standard test image, and obtaining the contrast ratio of the viewing effect image corresponding to the standard test image measured through a surface-type brightness measuring apparatus.

13. The method according to claim 1, further comprising:
determining whether stereoscopic display quality of the 3D display apparatus is qualified based on whether the resolution parameter at the preset viewing distance is greater than a preset resolution threshold.

14. A non-transient computer-readable storage medium comprising a stored program, wherein acts of the method according to claim 1 are implemented while the program is run.

15. An electronic device, comprising: a processor and a memory storing a computer program that is runnable on the processor, wherein acts of the method according to claim 1 are implemented when the processor executes the program.

16. The method according to claim 2, further comprising:
determining whether stereoscopic display quality of the 3D display apparatus is qualified based on whether the resolution parameter at the preset viewing distance is greater than a preset resolution threshold.

17. The method according to claim 3, further comprising:
determining whether stereoscopic display quality of the 3D display apparatus is qualified based on whether the resolution parameter at the preset viewing distance is greater than a preset resolution threshold.

18. The method according to claim 4, further comprising:
determining whether stereoscopic display quality of the 3D display apparatus is qualified based on whether the resolution parameter at the preset viewing distance is greater than a preset resolution threshold.

19. The method according to claim 12, further comprising:
determining whether stereoscopic display quality of the 3D display apparatus is qualified based on whether the resolution parameter at the preset viewing distance is greater than a preset resolution threshold.

20. An electronic device, comprising: a processor and a memory storing a computer program that is runnable on the processor, wherein acts of the method according to claim 2 are implemented when the processor executes the program.

* * * * *